(12) United States Patent
Smith et al.

(10) Patent No.: US 10,882,435 B2
(45) Date of Patent: Jan. 5, 2021

(54) VEHICLE TRAILER WITH ENGAGEMENT ARM ASSEMBLIES

(71) Applicant: Traila Group Pty Ltd, Gunnedah (AU)

(72) Inventors: Lindon Keith Smith, Toowoomba (AU); Andries Hilton Hechter, Toowoomba (AU)

( * ) Notice: Subject to any disclaimer, the term of this patent is extended or adjusted under 35 U.S.C. 154(b) by 0 days.

(21) Appl. No.: 16/083,443

(22) PCT Filed: Mar. 8, 2017

(86) PCT No.: PCT/AU2017/050208
§ 371 (c)(1),
(2) Date: Sep. 7, 2018

(87) PCT Pub. No.: WO2017/152232
PCT Pub. Date: Sep. 14, 2017

(65) Prior Publication Data
US 2019/0084464 A1    Mar. 21, 2019

(30) Foreign Application Priority Data

Mar. 8, 2016 (AU) .............................. 2016900866

(51) Int. Cl.
*B60P 1/28* (2006.01)
*B62D 63/08* (2006.01)
(Continued)

(52) U.S. Cl.
CPC .................. *B60P 1/286* (2013.01); *B60P 1/30* (2013.01); *B60P 1/6409* (2013.01); *B62D 63/08* (2013.01)

(58) Field of Classification Search
CPC .. B60P 1/16; B60P 1/483; B60P 1/283; B60P 1/286; B60P 1/64; B60P 1/6409;
(Continued)

(56) References Cited

U.S. PATENT DOCUMENTS 3,206,051 A * 9/1965 Troller ...................... B65F 1/12
414/403
3,254,781 A * 6/1966 Zink ...................... E02F 3/3486
414/487

(Continued)

FOREIGN PATENT DOCUMENTS

CH          327145 A      2/1958
FR         1209883 A      3/1960
(Continued)

*Primary Examiner* — Glenn F Myers
(74) *Attorney, Agent, or Firm* — Kearney, McWilliams & Davis, PLLC; William C Yarbrough (57) ABSTRACT

A vehicle trailer with a pair of engagement arm assemblies, one engagement arm assembly on either lateral side of the vehicle trailer, the vehicle trailer having a draw assembly for engagement with a vehicle, a chassis associated with the draw assembly and mounted on at least a pair of wheels and having at least a pair of spaced apart side rails, each side rail mounting an engagement arm assembly, each engagement arm assembly including an elongate rigid arm mounting an elongate engagement key, a first length adjustable arm associated with the elongate engagement key and a second length adjustable arm associated with the elongate rigid arm such that the elongate rigid arm can be raised and lowered to load and unload an object relative to the trailer and the elongate engagement key can be pivoted to tip an object mounted relative to the trailer.

22 Claims, 6 Drawing Sheets

(51) Int. Cl.
*B60P 1/30* (2006.01)
*B60P 1/64* (2006.01)

(58) Field of Classification Search
CPC ......... B60P 1/6418; B60P 1/6427; B60P 1/48;
B60P 1/04; B60P 1/30; B62D 63/062;
B62D 63/08; B62B 1/24; B65F 1/12;
B65F 1/1468; B65F 3/26; B65F
2003/025; B65F 2003/041; B65F 3/041
USPC ....... 414/425, 422, 466, 482, 483, 484, 486,
414/487, 468, 759, 758, 761, 771, 774,
414/779
See application file for complete search history.

(56) References Cited

U.S. PATENT DOCUMENTS

| | | | | | |
|---|---|---|---|---|---|
| 3,891,106 | A | * | 6/1975 | Alcanzare | B62B 1/20 |
| | | | | | 414/425 |
| 3,905,498 | A | * | 9/1975 | van der Lely | B60P 1/483 |
| | | | | | 414/424 |
| 4,515,510 | A | | 5/1985 | Heward | |
| 4,802,709 | A | * | 2/1989 | Jones | B60P 1/24 |
| | | | | | 298/10 |
| 5,391,043 | A | * | 2/1995 | Bohata | B65F 1/1452 |
| | | | | | 414/422 |

FOREIGN PATENT DOCUMENTS

| | | |
|---|---|---|
| GB | 1379699 A | 1/1975 |
| GB | 1429503 A | 3/1976 |

\* cited by examiner

VEHICLE TRAILER WITH ENGAGEMENT ARM ASSEMBLIES

TECHNICAL FIELD

The present invention relates to a vehicle trailer with engagement arm assemblies allowing the trailer to engage and disengage items to be carried on or by the vehicle trailer.

BACKGROUND ART

A skip or dumpster is a large open-topped waste container designed for loading onto a special type of truck. Instead of being emptied into a garbage truck on site, as a wheelie bin is, a skip is removed, or replaced by an empty skip, and then tipped at a landfill site or transfer station.

Typically skip bins have a distinctive shape: the longitudinal cross-section of the skip bin is either a trapezoid or two stacked trapezoids. The lower trapezoid has the smaller edge at the bottom of the skip bin, and a longer edge at the top. Where there is an upper trapezoid, it has the smaller edge at the top. At either end of the skip bin there is a sloping floor or wall. There are usually two lugs at the ends of the bin onto which chains can be attached, permitting the heavy skip bin to be lifted onto and off a truck. A special skip-carrying truck or crane is used.

One end of the skip sometimes has a large door that hinges down to allow manual loading and unloading. Skips are usually durable and tough, made to withstand rough use by tradesmen and labourers. The size of skip bins can vary greatly depending on their use, with sizes ranging from small 2 yard mini skips to the very large 40 yard roll-on roll-off skips. Even though these large bins can store many tonnes of waste, most trucks are limited to carrying around 8 tonnes (8,000 kg) of material in the container.

A typical small skip, when empty, weighs about 250 kilograms (550 lb).

Skip bins are useful but have limitations particularly due to the nature of the specialised truck required to transport them. Skip bins mounted to trailers have been made to attempt to address these issues. However, these generally have the skip bin mounted to the trailer permanently so that the trailer is delivered to the site and the skip bin remains on the trailer whilst at the site being filled and the trailer is simply connected to a vehicle for removal.

It will be clearly understood that, if a prior art publication is referred to herein, this reference does not constitute an admission that the publication forms part of the common general knowledge in the art in Australia or in any other country.

SUMMARY OF INVENTION

The present invention is directed to a vehicle trailer with engagement arm assemblies, which may at least partially overcome at least one of the abovementioned disadvantages or provide the consumer with a useful or commercial choice.

With the foregoing in view, the present invention in one form, resides broadly in a vehicle trailer with a pair of engagement arm assemblies, one engagement arm assembly on either lateral side of the vehicle trailer, the vehicle trailer having a) a draw assembly for engagement with a vehicle,
b) a chassis associated with the draw assembly and mounted on at least a pair of wheels and having at least a pair of spaced apart side rails, each side rail mounting an engagement arm assembly, each engagement arm assembly including
   a. an elongate rigid arm mounting an elongate engagement key,
   b. a first length adjustable arm associated with the elongate engagement key and
   c. a second length adjustable arm associated with the elongate rigid arm such that the elongate rigid arm can be raised and lowered to load and unload an object relative to the trailer and the elongate engagement key can be pivoted to tip an object mounted relative to the trailer.

In an alternative form, the present invention resides in a vehicle trailer mounted bin system including a) a trailer with a pair of engagement arm assemblies, one engagement arm assembly on either lateral side of the vehicle trailer, the vehicle trailer having
   i. a draw assembly for engagement with a vehicle,
   ii. a chassis associated with the draw assembly and mounted on at least a pair of wheels and having at least a pair of spaced apart side rails, each side rail mounting an engagement arm assembly, each engagement arm assembly including
      a. an elongate rigid arm mounting an elongate engagement key,
      b. a first length adjustable arm associated with the elongate engagement key and
      c. a second length adjustable arm associated with the elongate rigid arm;
b) a bin having an engagement assembly on either lateral side thereof, each having an elongate keyway to receive the respective elongate engagement key therein during loading of the bin on the trailer;

such that the elongate rigid arm can be raised and lowered to load and unload bin relative to the trailer and the elongate engagement key can be pivoted to tip the bin mounted relative to the trailer.

Providing a trailer that is adapted to engage an object in order to lift that object onto the trailer and to disengage the object from the trailer to leave the object in a desired location, creates a number of advantages. Using such a trailer to transport a skip bin or similar for disposal of rubbish or refuse allows a user to place the skip bin closer to rubbish, locate the skip bin in underground car parks where clearance prevents truck mounted skips from being deployed, and access car ports and garages for example.

The trailer of the present invention is typically adapted to be attached or engaged with a vehicle in order to be towed by the vehicle. Normally, the vehicle can be a "standard" vehicle. Provision of the trailer with engagement arm assemblies obviates the requirement for a specialised crane or rig in order to lift a skip bin for example. This will allow the trailer of the preferred embodiment to be used by a relatively inexperienced user and does not require any specialised equipment or training to use. The vehicle will normally be a car or SUV or the like with an appropriate towing arrangement.

The trailer of the present invention can be used to load and unload an object fitted with an appropriate engagement keyway in order to engage with the engagement arm assembly of the trailer. Although the present specification explains the invention in the context of a skip bin, the vehicle trailer of the present invention is not limited to use in combination with a skip bin and indeed, can be used to engage any object with the appropriate engagement keyway(s) provided with the object.

The trailer of the present invention includes a draw assembly for engagement with a vehicle. The purpose of the draw assembly is to allow the vehicle trailer to be engaged and disengaged with the vehicle in order to allow the vehicle to tow the trailer. The provision of a draw assembly also allows temporary use of the trailer. This will allow the vehicle trailer of the present invention and/or the object which the trailer is used to transport, to be leased or hired.

Any draw assembly can be used. Normally, the draw assembly will include an engagement or tow hitch. The draw assembly may also provide the ability to attach the trailer to a power source, particularly to power the trailer or components of the trailer from the vehicle to which the trailer is attached.

The draw assembly may include one or more jockey wheel assemblies to allow the trailer to be freestanding and/or relatively level when not attached to a vehicle.

The draw assembly will include a generally triangular forward portion with a tow hitch provided at the front of the triangular portion. The triangular portion will typically be permanently attached to (or form a part of) the chassis of the trailer and the draw assembly may be attached to or formed integrally with the chassis of the trailer.

The trailer of the present invention includes a chassis associated with the draw assembly. The chassis is mounted on at least a pair of wheels and has at least a pair of spaced apart side rails, each side rail mounting an engagement arm assembly.

The chassis of the trailer can have any configuration. Preferably, the chassis will be an open framework, formed from a number of members which are attached together and the chassis is either mounted to or mounts at least a pair of wheels, one on either side of the chassis to allow the trailer to be towed. The wheels are typically mounted at or approximately at the centre of mass or balance in order to allow the loading and unloading of an object without undue (preferably any) tipping of the trailer.

Normally, the chassis is provided as a substantially rectangular support section provided immediately behind the draw assembly and the pair of spaced apart side rails typically extend rearwardly of the rectangular support section. The rectangular support section normally supports the object when the object is loaded onto the vehicle trailer. The support section will normally be an open framework made from more than one member attached together. Preferably, the spaced apart side rails will form part of the rectangular support section, typically defining the lateral edges of the support assembly. One or more transverse members are typically provided between the pair of spaced apart side rails and attached thereto, in order to define the rectangular support section. The members provided in the rectangular support section typically have at least a portion which is coplanar with one another in order to form a planar support surface made up of a surface of each of the members.

The substantially rectangular support section may be provided with one or more solid floor panels in some embodiments, but floor panels will typically only be required where the object being transported on the trailer does not have a large enough footprint to be supported by the open framework of the preferred rectangular support section.

The side rails of the trailer are preferably elongate, extending further rearwardly than the substantially rectangular support section. When viewed in plan, the preferred chassis resembles a rectilinear A shape with the free ends of the side rails located at the rear of the trailer. The extended side rails will typically provide clearance for the object to be placed on the ground between the side rails during unloading and to allow the object to be accessed between the side rails during loading.

Preferably, each of the number of members which form the chassis, and the side rails themselves will be manufactured of a strong, rigid material and will generally be metal. The members and side rails will normally be hollow and a box section is preferred for strength.

The wheels provided on the trailer of the present invention are mounted to one or more transverse axles. Each wheel may be mounted to a stub axle extending only partially across the width of the trailer but this is less preferred than an elongate axle linking a pair of spaced apart wheels and extending across the entire width of the trailer. Generally speaking, the number of wheels provided on the trailer will be dependent upon the size of the trailer and/or the load rating of the trailer.

Each of the spaced apart side walls mounts an engagement arm assembly. Each engagement arm assembly is generally mounted to or relative to a respective spaced apart side rail. Each of the engagement arm assemblies includes an elongate rigid arm mounting an elongate engagement key. Each elongate rigid arm is preferably substantially planar. The elongate rigid arm is typically pivotally mounted relative to the respective side rail. According to a preferred embodiment, at least one, and preferably a pair of mounting arms are provided in order to mount the elongate rigid arm relative to the respective side rail. Preferably, an inner mounting arm and an outer mounting arm are provided. Each of the inner mounting arm and outer mounting arm are pivotally mounted to the lower end of the elongate rigid arm and/or the respective side rail.

The elongate rigid arm has an upper end and a lower end with the lower end mounted relative to a respective side rail and the upper end mounted to or relative to the elongate engagement key. The lower end of each elongate rigid arm may be movable relative to the rail in particular, may be slidable along the rail between a pair of mounting points mounting the first length adjustable arm and the second length adjustable arm, but will preferably be fixed in location.

Preferably, the elongate rigid arm will be provided with a shaped portion along the length of the elongate rigid arm in order to mount the second length adjustable arm. The second length adjustable arm preferably raises and lowers the elongate rigid arm. Normally, the second length adjustable arm can move the elongate rigid arm between a substantially vertical orientation and an orientation in which the arm is substantially parallel to the respective side rail. Preferably, the elongate rigid arm will be oriented angled forwardly in the loaded condition and then rotated through vertical to a rearward angle for unloading and will be substantially vertical during tipping (emptying) and the second length adjustable arm will normally move or assist with movement between these positions.

The shaped portion is typically provided to allow attachment of the second length adjustable arm to the elongate rigid arm and to provide a fulcrum or additional leverage in order to allow the second length adjustable arm to move the elongate rigid arm, even when bearing a significant load. The mounting portion is normally provided as a shaped protrusion with an engagement point for the attachment of the second length adjustable arm provided on the protrusion. The protrusion in some embodiments is substantially triangular in shape and an Isosceles triangular shaped portion is particularly preferred. Normally, the attachment point will be provided as an opening and the opening is normally provided towards the free corner of the preferred triangular shaped portion.

Preferably, the other end of the second length adjustable arm is mounted to or relative to the respective side rail at a location spaced from the mounting point of the elongate rigid arm. Again, the mounting of the second length adjustable arm to the side rail may be fixed in position but the arm is preferably pivotally mounted to the side rail.

The second length adjustable arm may have any length adjustable mechanism or operation. According to a particularly preferred embodiment, the second length adjustable arm is or includes a ram and a hydraulic or pneumatic ram could be used. It is preferred that the ram is a powered ram so that the ram can be driven to extend and retract. Generally, the second length adjustable arm will be shorter than the first length adjustable arm.

The first length adjustable arm may have any length adjustable mechanism or operation. According to a particularly preferred embodiment, the first length adjustable arm is or includes a ram and a hydraulic or pneumatic ram could be used. It is preferred that the ram is a powered ram so that the ram can be driven to extend and retract. Generally, the first length adjustable arm will be longer than the second length adjustable arm. The first length adjustable arm typically has an upper end associated with the elongate engagement key of the engagement arm assembly and a lower end which is mounted to or relative to the respective side rail.

The first length adjustable arm and the second length adjustable arm can be used independently from one another but preferably in combination in order to control the position and movement of the elongate rigid arm and/or the engagement key. Preferably, the second length adjustable arm will have more control over the position and movement of the elongate rigid arm than the first length adjustable arm and the first length adjustable arm will normally have more control over the position and orientation of the engagement key than the second length adjustable arm.

The elongate engagement key is typically mounted to or relative to an upper end of the elongate rigid arm and an upper end of the first length adjustable arm. Preferably, the engagement key is oriented towards the centre of the trailer and therefore, the elongate engagement keys on the respective engagement arm assemblies normally face one another. The elongate engagement key is normally mounted to both the elongate rigid arm and the first length adjustable arm and preferably, an external stabiliser member is provided in order to provide a more robust mounting between the components. In particular, it is preferred that the upper end of the elongate rigid arm and the upper end of the first length adjustable arm are both sandwiched between the external stabiliser member and a portion of the elongate engagement key.

Preferably, the external stabiliser member will have the same shape as a portion of the engagement key but this need not be the case. According to a most preferred embodiment, the preferred shape of the external stabiliser is elongate with a substantially C-shaped portion provided at either end and an opening in each of the C-shaped portions. Preferably, the openings in the respective C-shaped portions are slot openings each having an entry way and the respective entryways of the opening is typically face away from one another. This provides the external stabiliser member with a shaped similar to a double ended open spanner.

A transversely extending fastener or pin is preferably engaged through the respective openings, at both ends, to attach the upper end of the elongate rigid arm or the upper end of the length adjustable arm and then through a corresponding opening provided in the elongate engagement key.

The engagement key may have any shape. Preferably, the engagement key is substantially H-shaped in cross section having a pair of spaced apart arm portions linked by a transversely extending linking wall. Normally, one of the arm portions is an inner arm portion and the other arm portion is an outer arm portion, with these positions being defined according to the engagement of the engagement key with the preferred elongate keyway. Preferably, the outer arm portion is shaped to correspond with the shape of the external stabiliser member.

The inner arm portion is preferably substantially planar and rectangular in shape.

The transversely extending linking wall will typically have the same dimension over its length and will typically be as long as the inner arm portion. The transversely more is typically received closely within a receiving slot forming the elongate keyway.

Preferably, the engagement key will be solid and manufactured from a robust material such as metal but one or more portions of the engagement key may be hollow if desired.

A universal or multi axis joint is preferably provided between the first length adjustable arm and the elongate key.

As suggested above, the elongate keyway with which the engagement key preferably engages will typically be provided on an object. Normally, the elongate keyway is provided as a slot opening formed in a preferably substantially planar plate which is located spaced from a wall or surface of the object such that the inner arm portion of the engagement key can be received between the preferred substantially planar plate and the external surface of the object. Normally, the keyway is provided in a raised housing portion having a part which is spaced from the surface of the object. The housing portion is normally provided with a substantially U-shaped wall having an upper wall portion, a lower wall portion each of which is attached to or relative to the object and an outer wall which is spaced from the wall or surface of the object with the outer wall provided with the slot opening.

Preferably, the elongate slot does not extend completely through the outer wall of the housing portion and is normally closed at one end. The closed end is normally positioned toward the rear of the object and the forward end of the elongate slot is preferably open to receive the elongate key. The elongate slot may have a shaped entryway. Preferably, the entryway converges in order to guide the key into the keyway during the engagement. Preferably, a pair of converging wall portions are provided in association with the housing wall portion.

One or more internal bracing structures are preferably provided between an inner side of the outer wall of the housing portion and an outer surface of the object. Preferably, the internal bracing structures are substantially planar plate is provided extending substantially parallel to the upper and lower walls of the housing portion. The internal bracing structures will typically abut the side edges of the inner portion of the key when the key is in engagement with the keyway. Some small clearance may be provided between the side edges of the inner portion of the key and the internal bracing structures provided but it is preferred that this clearance, if any, the minimal. The internal bracing structures are typically attached to the surface or wall of the object and an inner side of the outer wall of the housing portion. Normally, an internal bracing structure is provided on either side (upper and lower) of the slot opening, preferably extending substantially the length of the slot opening. The internal bracing structures may also be provided with converging portions in order to assist with guidance of the key during the engagement process.

It is further preferred according to some embodiments that an opening is provided through the elongate engagement key and a portion of the upper end/or lower walls of the housing portion in which the keyway is defined in order to accept a locking pin. Typically, the locking pin will be elongate with an enlarged head in order to abut an upper portion of an upper wall and the locking pin will be insertable when the key is correctly registered in the keyway which will preferably align the openings in the key and the upper wall and/or lower wall of the housing portion. Typically, an opening is provided through the upper wall of the housing portion and not the lower wall.

In an alternative embodiment, the keyway may be provided on a plat or similar that can then be temporarily attached to an object to be transported. For example, one or more keyways may be provided on an extendable strap that can be attached to an object in order to utilise the trailer of the preferred embodiment to load, transport and unload the object.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

According to a particularly preferred embodiment of the present invention, a vehicle trailer with engagement arms is provided.

Figure 1:
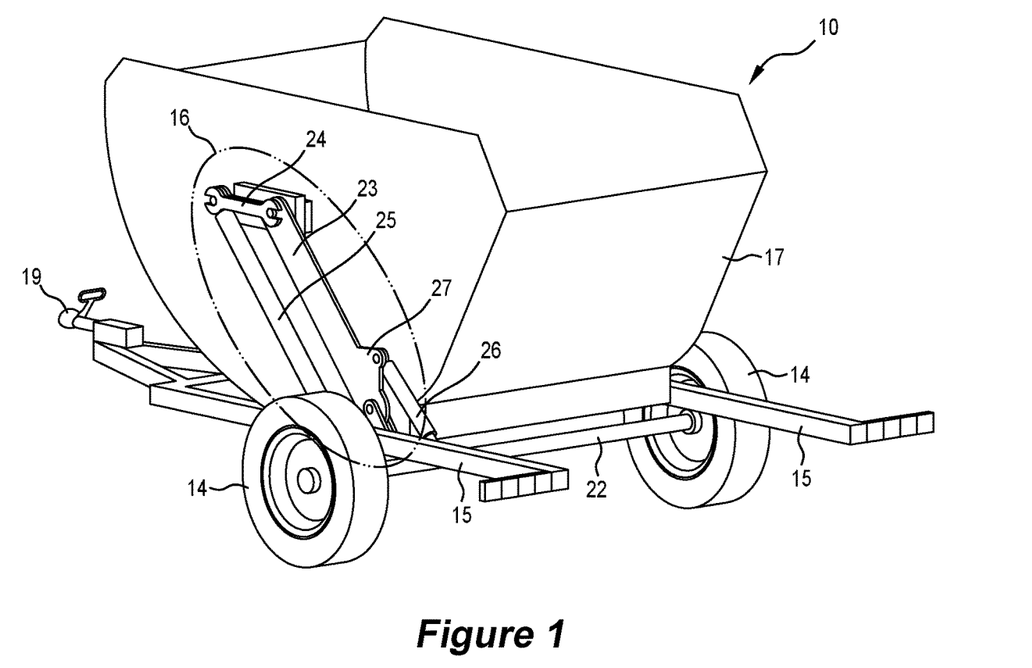
FIG. 1 is an isometric view of a trailer of a preferred embodiment with a bin in the loaded condition.
Figure 2:
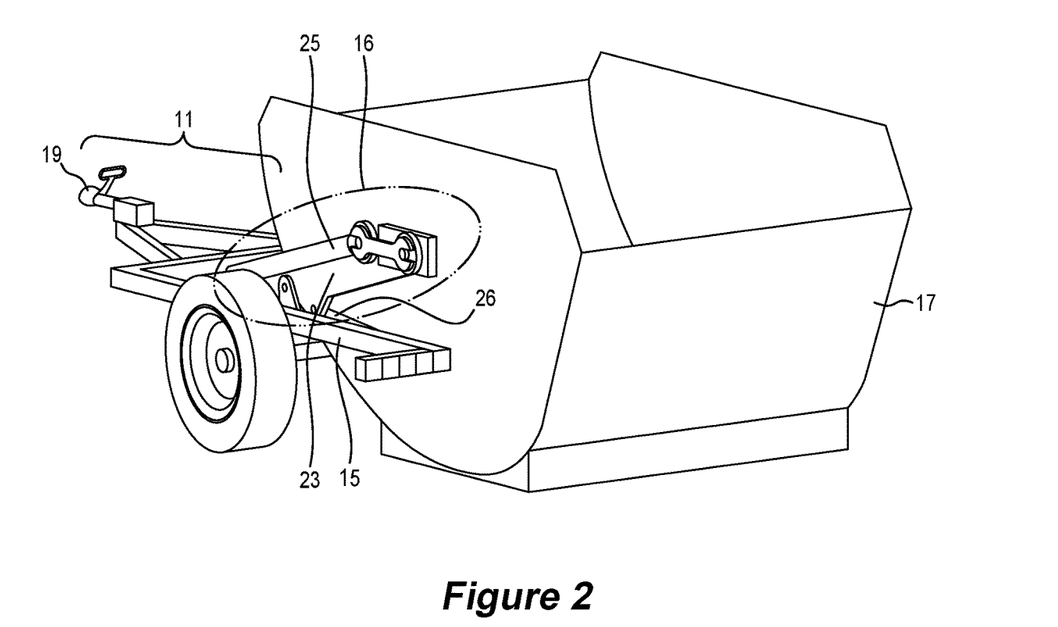
FIG. 2 is an isometric view of the trailer illustrated in FIG. 1 in the unloaded condition.
Figure 3:
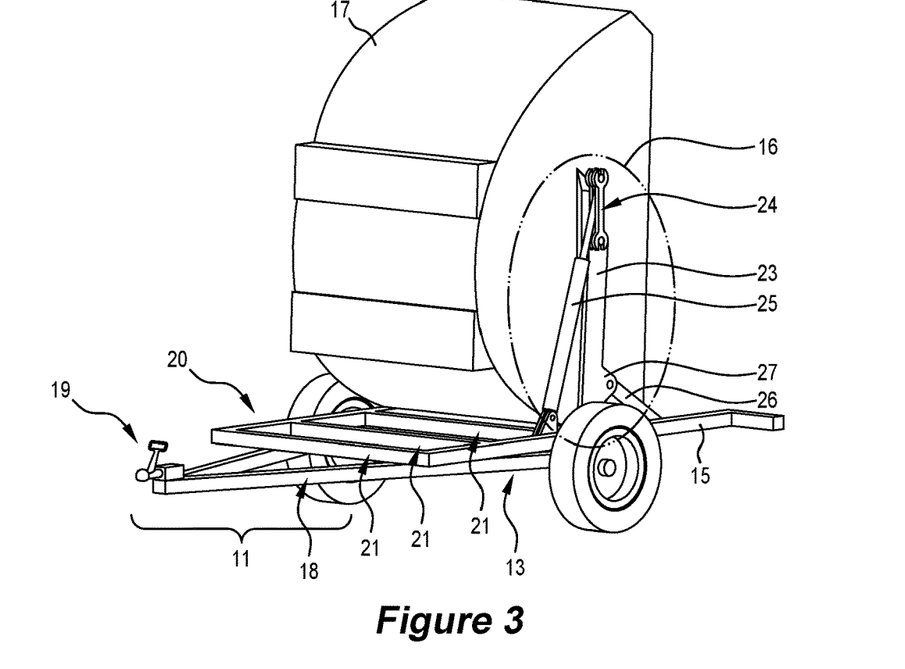
FIG. 3 is an isometric view of the trailer illustrated in FIG. 1 in the tipped or emptying condition.

The vehicle trailer mounted bin system 10 illustrated in the Figures has a draw assembly 11 for engagement with a towing vehicle 12 and a chassis 13 associated with the draw assembly 11 and mounted on at least a pair of wheels 14. The chassis 13 has a pair of spaced apart side rails 15 with each side rail 15 mounting an engagement arm assembly 16. The illustrated system includes a bin 17 having an engagement assembly to engage with an engagement arm assembly 16 during loading of the bin on the trailer. As illustrated in FIGS. 1 and 2, the engagement arm assembly 16 can be raised and lowered to load and unload bin relative to the trailer and can be moved to tip the bin mounted relative to the trailer as illustrated in FIG. 3.

Figure 4:
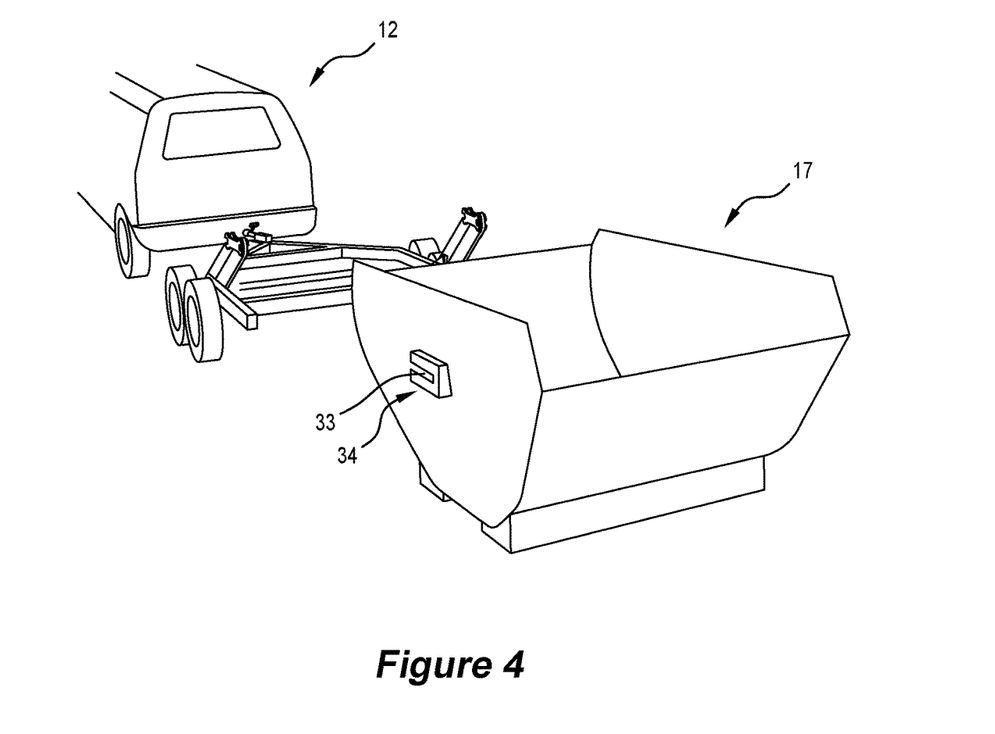
FIG. 4 is an isometric view of the trailer illustrated in FIG. 1 in the pre-loading condition or the unloaded condition.

As illustrated in FIG. 4 in particular, the trailer of the preferred embodiment is adapted to be attached or engaged with a vehicle 12 in order to be towed by the vehicle 12. Normally, the vehicle 12 is a standard vehicle and does not require a specialised crane or rig in order to engage with trailer. This will allow the trailer of the preferred embodiment to be used by a relatively inexperienced user and does not require any specialised equipment or training to use. The vehicle will normally be a car or SUV or the like with an appropriate towing arrangement.

The trailer of the present invention includes a draw assembly 11 for engagement with the vehicle 12. The purpose of the draw assembly is to allow the vehicle trailer to be engaged and disengaged with the vehicle in order to allow the vehicle to tow the trailer. The provision of a draw assembly also allows temporary use of the trailer. This will allow the vehicle trailer of the present invention and/or the object which the trailer is used to transport, to be leased or hired.

As illustrated, the draw assembly 11 includes a generally triangular forward portion 18 with a tow hitch 19 provided at the front of the triangular portion 18. The triangular portion 18 is permanently attached to the chassis 13 of the trailer.

The draw assembly will typically provide the ability to attach the trailer to a power source, particularly to power the trailer or components of the trailer from the towing vehicle 12 to which the trailer is attached.

The chassis 13 of the trailer can have any configuration. Preferably, the chassis 13 will be an open framework, formed from a number of members which are attached together and the chassis is either mounted to or mounts at least a pair of wheels 14, one on either side of the chassis 13 to allow the trailer to be towed. The wheels 14 are typically mounted at or approximately at the centre of mass or balance in order to allow the loading and unloading of an object without tipping of the trailer. In the illustrated embodiments, the trailer in FIGS. 1 to 4 is a two wheel trailer whereas the trailer in FIGS. 8 to 11 is a heavier duty, four wheel trailer.

Figure 11:
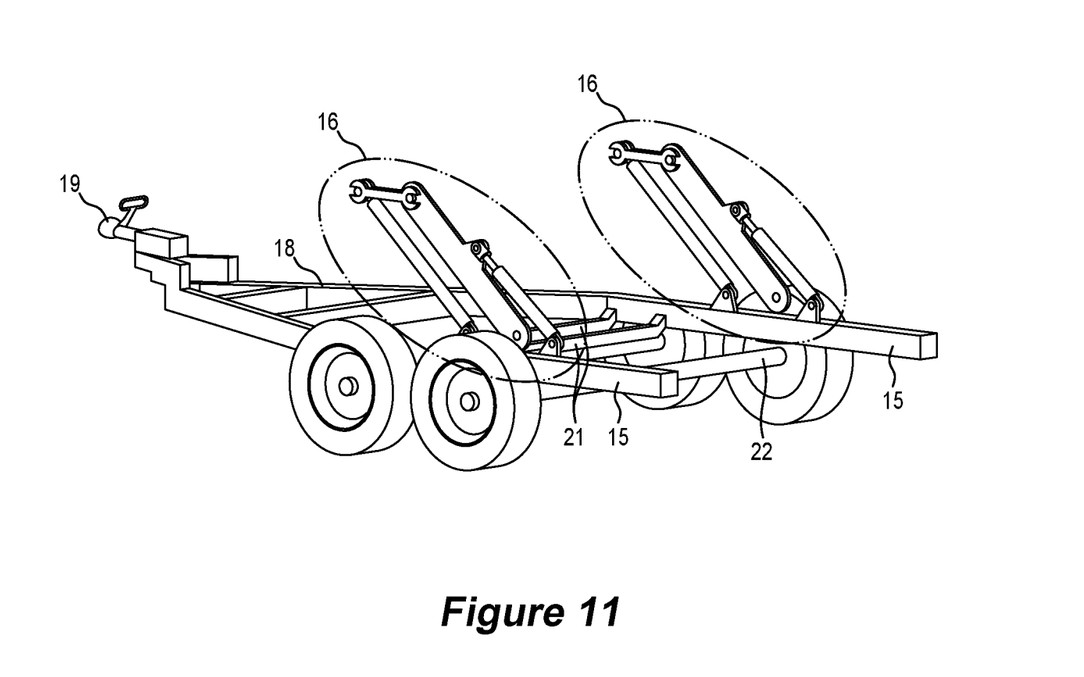
FIG. 11 is an isometric view of the trailer illustrated in FIG. 8 without the bin.

Normally, the chassis 13 is provided as a substantially rectangular support section 20 provided immediately behind the draw assembly 11 and the pair of spaced apart side rails 15 forming a part of the rectangular support section 20 extend rearwardly of the rectangular support section 20. The rectangular support section 20 normally supports the bin 17 when the bin 17 is loaded onto the vehicle trailer as illustrated in FIG. 1. As best shown in FIGS. 3 and 11, the support section 20 will normally be an open framework made from more than one member attached together. Preferably, the spaced apart side rails 15 will form part of the rectangular support section 20, typically defining the lateral edges of the support section 20. Transverse members 21 are typically provided between the pair of spaced apart side rails 15 and attached thereto in order to define the rectangular support section 20. The members provided in the rectangular support section typically have at least a portion which is coplanar with one another in order to form a planar support surface made up of a surface of each of the members. As illustrated in FIG. 3, the transverse members 21 are located above the side rails 15 whereas in FIG. 11, the transverse members 21 are located slightly below the side rails 15.

The substantially rectangular support section may be provided with one or more solid floor panels in some embodiments but floor panels will typically only be required where the object being transported on the trailer does not have a large enough footprint to be supported by the open framework of the preferred rectangular support section. As illustrated in FIG. 3, the bin 17 has a large footprint base to spread the load and allow use of the open frame support section.

The side rails 15 of the trailer are elongate, extending further rearwardly than the substantially rectangular support section 20. When viewed in plan, the chassis of the preferred embodiment resembles a rectilinear A-shape with the free ends of the side rails 15 located at the rear of the trailer. The extended side rails 15 will typically provide clearance for the bin 17 to be placed on the ground between the side rails 15 during unloading and to allow the bin 17 to be located between the side rails 15 during loading as illustrated in FIG. 2.

Preferably, each of the members which form the chassis 13 and the side rails 15 will be manufactured of a strong, rigid material and will generally be metal. The members and side rails will normally be hollow and a box section is preferred for strength.

The wheels 14 provided on the trailer of the present invention are mounted to an elongate transverse axle 22 in pairs with each elongate axle 22 linking a pair of spaced apart wheels 14 and extending across the width of the trailer. Generally speaking, the number of wheels provided on the trailer will be dependent upon the size of the trailer and/or the load rating of the trailer.

Each of the spaced apart side rails 15 mounts an engagement arm assembly 16. Each engagement arm assembly 16 is generally mounted to or relative to a respective spaced apart side rail 15. Each of the engagement arm assemblies 16 includes an elongate rigid arm 23 mounting an elongate engagement key 24, a first length adjustable arm 25 associated with the elongate engagement key 24 and a second length adjustable arm 26 associated with the elongate rigid arm 23.

Each elongate rigid arm 23 is preferably substantially planar. The elongate rigid arm 23 in each assembly 16 is pivotally mounted relative to the respective side rail 15 using an inner mounting arm and an outer mounting arm (shown in FIG. 1) provided in order to mount the elongate rigid arm 23 relative to the respective side rail 15. Each of the inner mounting arm and outer mounting arm are pivotally mounted to the lower end of the elongate rigid arm 23 and/or the respective side rail 15.

Figure 5:
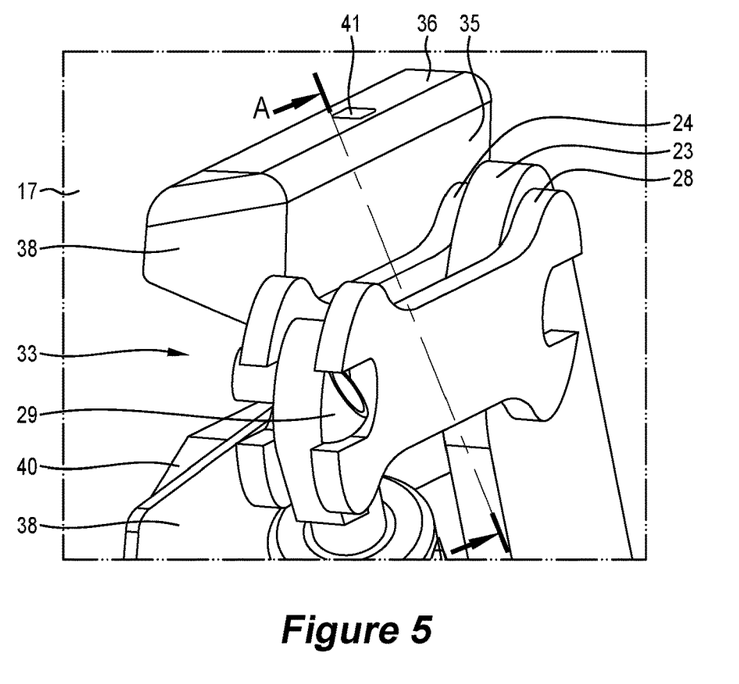
FIG. 5 is an isometric detailed view of an engagement between an engagement arm of the preferred embodiment and an engagement portion provided on an object or device.
Figure 6:
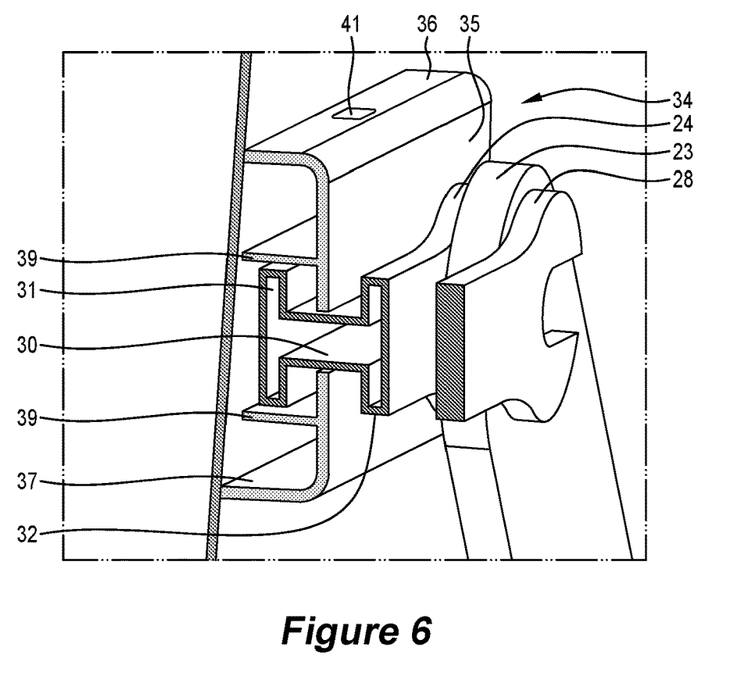
FIG. 6 is a sectional view of the configuration illustrated in FIG. 5 along line A-A.
Figure 7:
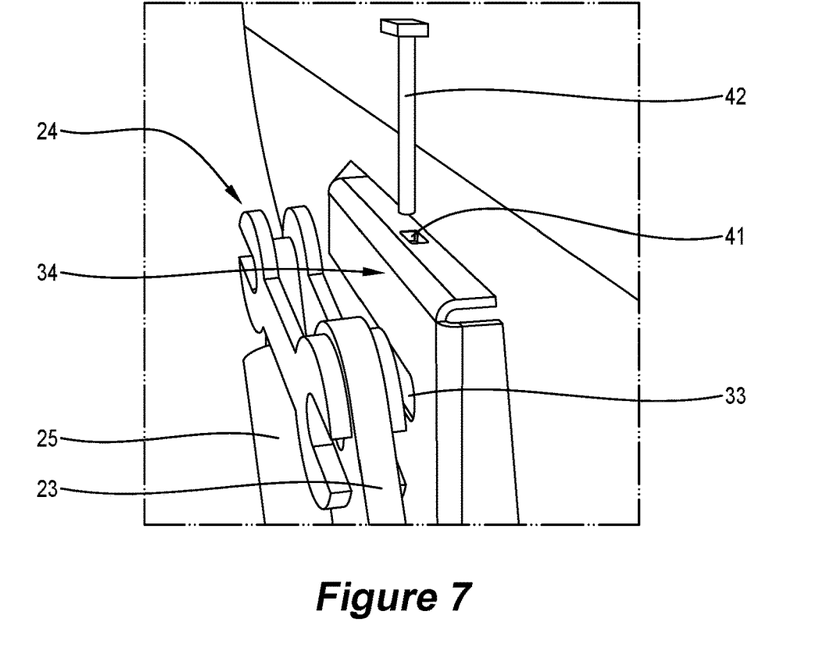
FIG. 7 is an isometric view from the rear of the configuration illustrated in FIG. 5 with the optional locking pin.
Figure 8:
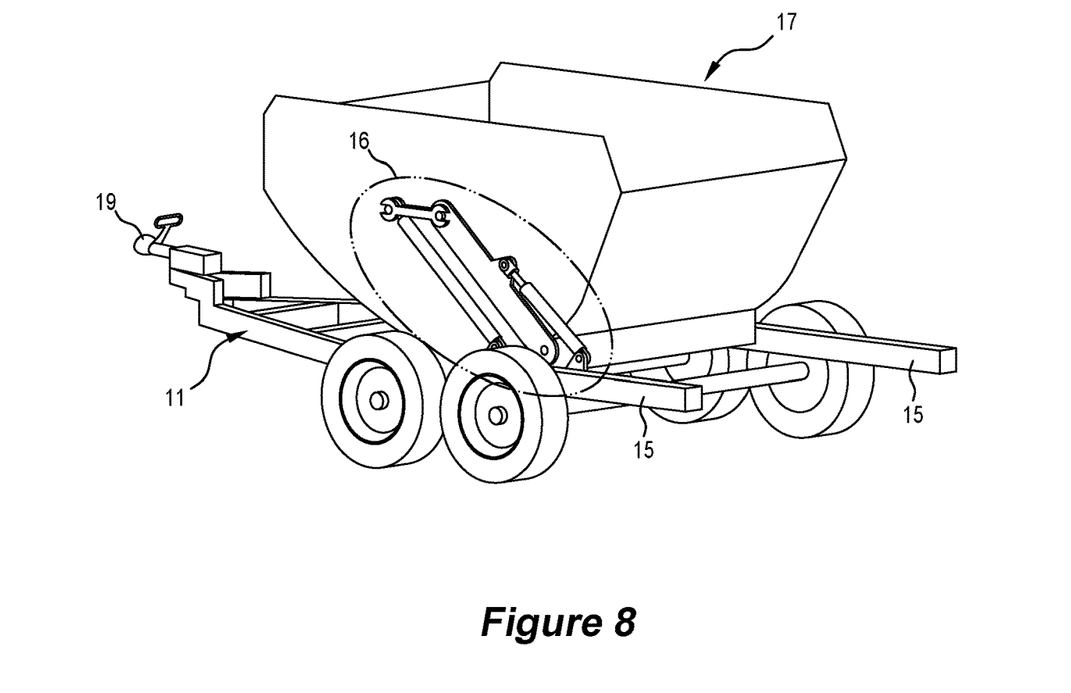
FIG. 8 is an isometric view of a trailer of a preferred embodiment with a bin in the loaded condition.
Figure 9:
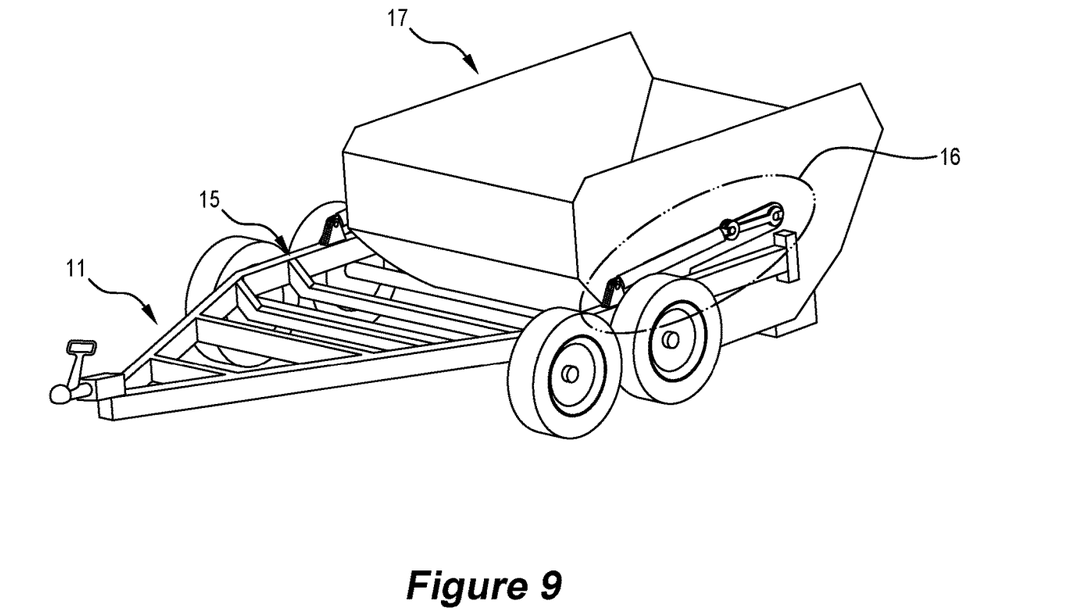
FIG. 9 is an isometric view of the trailer illustrated in FIG. 8 in the unloaded condition.
Figure 10:
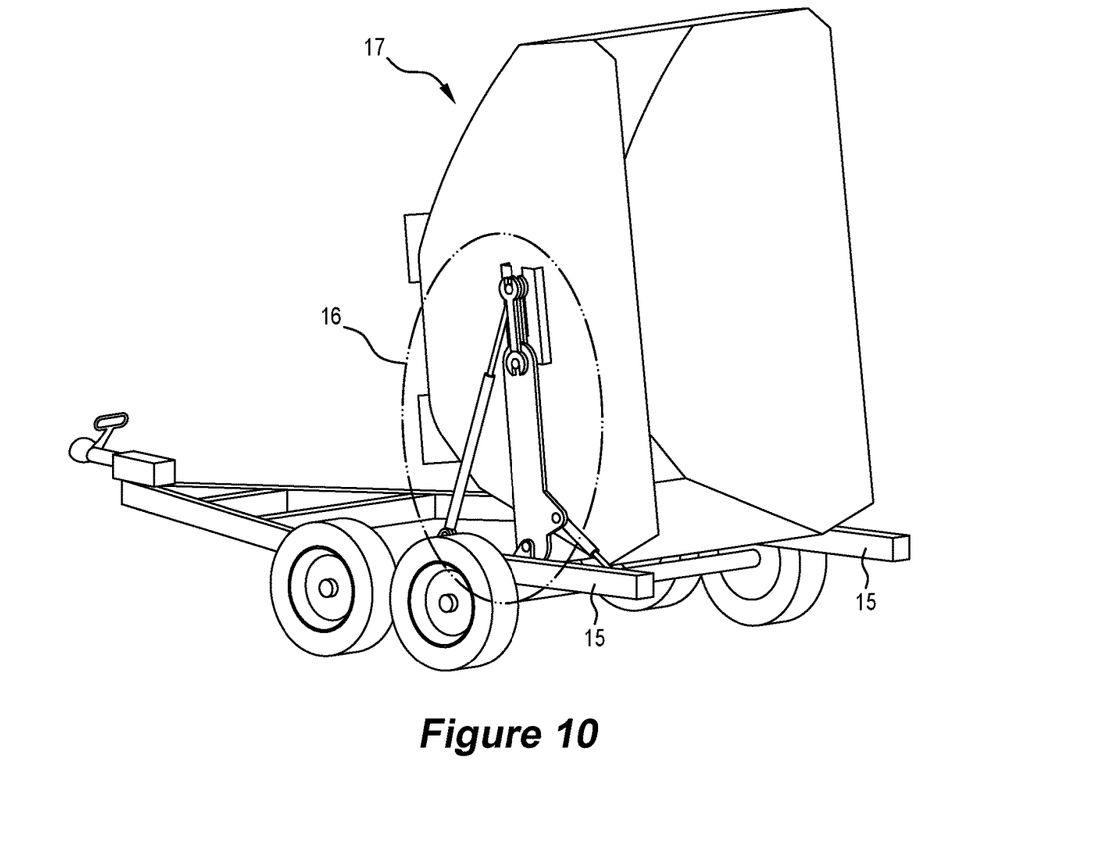
FIG. 10 is an isometric view of the trailer illustrated in FIG. 8 in the tipped or emptying condition.

The elongate rigid arm 23 has an upper end and a lower end with the lower end mounted relative to the respective side rail and the upper end mounted to or relative to the elongate engagement key 24 as illustrated in detail in FIGS. 5 to 7.

Preferably, the elongate rigid arm 23 will be provided with a shaped portion 27 along the length of the elongate rigid arm 23 in order to mount the second length adjustable arm 26. The second length adjustable arm 26 raises and lowers the elongate rigid arm 23. Normally, the second length adjustable arm 26 can move the elongate rigid arm 23 between a substantially vertical orientation illustrated in FIGS. 1 and 3 (and hold the arm in that position) and an orientation in which the arm 23 is substantially parallel to the respective side rail 15 as illustrated in FIG. 2. The shaped portion 27 is typically provided to allow attachment of the second length adjustable arm 26 to the elongate rigid arm 23 and to provide a fulcrum or additional leverage in order to allow the second length adjustable arm 26 to move the elongate rigid arm 23 even when bearing a significant load. The shaped portion 27 is normally provided as a shaped protrusion with an engagement point for the attachment of the second length adjustable arm 26 provided on the shaped portion 27. The shaped portion 27 in the illustrated embodiments is substantially triangular in shape and an Isosceles triangular shaped portion is particularly preferred. Normally, the attachment point is provided as an opening and the opening is normally provided towards the free corner of the preferred triangular shaped portion.

Preferably, the lower end of the second length adjustable arm 26 is mounted to or relative to the respective side rail 15 at a location spaced from the mounting point of the elongate rigid arm 23. Again, the mounting of the second length adjustable arm 26 to the side rail 15 is fixed in position and the arm 26 is preferably pivotally mounted to the side rail 15.

The second length adjustable arm 26 may have any length adjustable mechanism or operation. According to a particularly preferred embodiment, the second length adjustable arm 26 is a hydraulic ram. It is preferred that the hydraulic ram is a powered ram so that the hydraulic ram can be driven to extend and retract. As illustrated, the second length adjustable arm 26 is shorter than the first length adjustable arm 25.

The first length adjustable arm 25 may have any length adjustable mechanism or operation. According to a particularly preferred embodiment, the first length adjustable arm 25 is or includes a hydraulic ram. It is preferred that the hydraulic ram is a powered ram so that the hydraulic ram can be driven to extend and retract. Generally, the first length adjustable arm 25 is longer than the second length adjustable arm 26. The first length adjustable arm 25 typically has an upper end associated with the elongate engagement key 24 of the engagement arm assembly 16 and a lower end which is mounted to or relative to the respective side rail 15.

The first length adjustable arm 25 and the second length adjustable arm 26 can be used independently from one another or in combination in order to control the position and movement of the elongate rigid arm 23 and/or the engagement key 24. Preferably, the second length adjustable arm 26 will have more control over the position and movement of the elongate rigid arm 23 than the first length adjustable arm 25 and the first length adjustable arm 25 will normally have more control over the position and orientation of the engagement key 24 than the second length adjustable arm 26.

The elongate engagement key 24 is mounted to or relative to an upper end of the elongate rigid arm 23 and an upper end of the first length adjustable arm 25. Preferably, the engagement key 24 is oriented towards the centre of the trailer and therefore, the elongate engagement keys 24 on the respective engagement arm assemblies 16 normally face one another. As illustrated best in FIG. 5, the elongate engagement key 24 is normally mounted to both the elongate rigid arm 23 and the first length adjustable arm 25 and according to the illustrated embodiment, an external stabiliser member 28 is provided in order to provide a more robust mounting between the components. In particular, it is preferred that the upper end of the elongate rigid arm 23 and the upper end of the first length adjustable arm 25 are both sandwiched between the external stabiliser member 28 and a portion of the elongate engagement key 24 as illustrated in FIG. 5.

Preferably, the external stabiliser member 28 will have the same shape as a portion of the engagement key 24 but this need not be the case. According to a most preferred embodiment, the preferred shape of the external stabiliser 28 is elongate with a substantially C shaped portion provided at either end and an opening in each of the C shaped portions. Preferably, the openings in the respective C shaped portions are slot openings each having an entry way and the respective entryways of the opening is typically face away from one another. This provides the external stabiliser member 28 with a shaped similar to a double ended open spanner.

A transversely extending fastener or pin (absent from FIG. 5 for clarity) is preferably engaged through the respective openings, to attach the upper end of the elongate rigid arm or the upper end of the length adjustable arm and then through a corresponding opening provided in the elongate engagement key.

The engagement key 24 may have any shape. Preferably, the engagement key 24 is substantially H-shaped in cross section (as illustrated in FIG. 6) having a pair of spaced apart arm portions linked by a transversely extending linking wall 30. Normally, one of the arm portions is an inner arm 31 and the other arm portion is an outer arm portion 32, with these positions being defined according to the engagement of the engagement key 24 with the preferred elongate keyway as shown in FIG. 6. Preferably, the outer arm portion 32 is shaped to correspond with the shape of the external stabiliser member 28.

The inner arm portion 31 is preferably substantially planar and rectangular in shape.

The transversely extending linking wall 30 illustrated has the same dimension over its length and will typically be as long as the inner arm portion 31. The transversely extending linking wall 30 is typically received closely within a receiving slot 33 forming the elongate keyway.

Preferably, the engagement key 24 will be solid and manufactured from a robust material such as metal but one or more portions of the engagement key may be hollow if desired.

A universal or multiaxis joint 29 is preferably provided between the first length adjustable arm 25 and the elongate key 24.

As suggested above, the elongate keyway with which the engagement key 24 preferably engages will typically be provided on an object, in the illustrated embodiments, a bin 17. Normally, the elongate keyway is provided as a slot opening 33 formed in a preferably substantially planar outer wall 35 of a raised housing portion 34 which is located spaced from a wall or surface of the bin 17 such that the inner arm portion 31 of the engagement key 24 can be received between the substantially planar outer wall 35 and the external surface of the bin 17. The housing portion 34 is normally provided with a substantially U-shaped wall having an upper wall portion 36 and a lower wall portion 37, each of which is attached to the bin 17 and the outer wall 35 which is spaced from the wall or surface of the bin 17, the outer wall 35 provided with the slot opening 33.

As illustrated in FIG. 7, the elongate slot opening 33 does not extend completely through the outer wall 35 of the housing portion 34 and is normally closed at one end. The closed end is normally positioned toward the rear of the bin 17 and the forward end of the elongate slot opening 33 is open to receive the elongate key 24 as illustrated in FIG. 5. The elongate slot opening 33 has a shaped entryway. Preferably, the entryway converges in order to guide the key 24 into the slot opening 33 during the engagement. Preferably, a pair of converging wall portions 38 are provided in association with the outer wall portion 35.

Internal bracing structures 39 are provided between an inner side of the outer wall 35 of the housing portion and an outer surface of the bin 17. Preferably, the internal bracing structures 39 are substantially planar plates provided extending substantially parallel to the upper and lower walls of the housing portion 34. The internal bracing structures 39 will typically abut the side edges of the inner portion 31 of the key 24 when the key is in engagement with the keyway. Some small clearance may be provided between the side edges of the inner portion of the key and the internal bracing structures 39 provided but it is preferred that this clearance, if any, be minimal. The internal bracing structures 39 are typically attached to the surface or wall of the bin 17 and an inner side of the outer wall 35 of the housing portion 34. Normally, an internal bracing structure is provided above and below of the slot opening, preferably extending substantially the length of the slot opening 33. The internal bracing structures 39 are also provided with converging portions 40 in order to assist with guidance of the key during the engagement process.

An opening 41 is provided through the elongate engagement key 24 and a portion of the upper wall 36 of the housing portion 34 in which the keyway is defined in order to accept a locking pin 42. Typically, the locking pin 42 will be elongate with an enlarged head in order to abut the upper wall 36 and the locking pin 42 will be insertable when the key 24 is correctly registered in the keyway which will preferably align the openings in the key 24 and the upper wall 36 of the housing portion 34. Typically, the opening 41 is provided through the upper wall of the housing portion 34 and an opening is not provided in the lower wall.

In use, the engagement arm assembly 16 can be used to load a bin onto the trailer as illustrated in FIG. 2 and the loaded condition is illustrated in FIG. 1. The engagement arm assembly can also be operated to tip the bin in order to empty the bin as illustrated in FIG. 3. The provision of the elongate engagement key 24 particularly provides the ability to tip the bin.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A vehicle trailer with engagement arm assemblies allowing for engagement and disengagement of items to be carried on or by a vehicle trailer comprising:
a pair of engagement arm assemblies, wherein one said engagement arm assembly resides on either lateral side of said vehicle trailer;
a draw assembly for engagement with a vehicle,
a chassis associated with said draw assembly and mounted on at least a pair of wheels and having at least a pair of spaced apart side rails, each said side rail mounting said engagement arm assembly;
each said engagement arm assembly includes an elongate rigid arm mounting an elongate engagement key or elongate engagement keyway,
a first length adjustable arm associated with said elongate engagement key or elongate engagement keyway,
wherein said elongate rigid arm can be raised and lowered to load and unload an object relative to said vehicle trailer and said elongate engagement key or elongate engagement keyway can be pivoted to tip an object mounted relative to said vehicle trailer, and
wherein an opening is provided through said elongate engagement key and a portion of said elongate keyway in order to accept a locking pin.

2. The vehicle trailer as claimed in claim 1, wherein said elongate engagement key or elongate engagement keyway is used to load and unload said object, said object fitted with a corresponding elongate engagement key or elongate engagement keyway.

3. The vehicle trailer as claimed in claim 1, wherein said chassis is provided as a substantially rectangular support section provided immediately behind said draw assembly, said rectangular support section supporting said object when said object is loaded onto said vehicle trailer.

4. The vehicle trailer as claimed in claim 1, wherein each said elongate rigid arm is substantially planar and pivotally mounted relative to said chassis.

5. The vehicle trailer as claimed in claim 4, wherein at least one mounting arm is provided in order to mount said elongate rigid arm relative to said respective side rail.

6. The vehicle trailer as claimed in claim 5, wherein an inner mounting arm and an outer mounting arm are provided, each of said inner mounting arm and said outer mounting arm pivotally mounted to a lower end of said elongate rigid arm and/or said respective side rail.

7. The vehicle trailer as claimed in claim 1, wherein each said elongate rigid arm is provided with a shaped portion along the length of said elongate rigid arm in order to mount a second length adjustable arm, said second length adjustable arm associated with said elongate rigid arm.

8. The vehicle trailer as claimed in claim 7, wherein said mounting portion is provided as a shaped protrusion with an engagement point for the attachment of said second length adjustable arm provided on said shaped protrusion.

9. The vehicle trailer as claimed in claim 1, wherein said second length adjustable arm raises and lowers said elongate rigid arm between a substantially vertical orientation and an orientation in which said second length arm is positioned to allow said object to abut a ground surface.

10. The vehicle trailer as claimed in claim 1, wherein said second length adjustable arm is or includes a powered hydraulic or pneumatic ram.

11. The vehicle trailer as claimed in claim 1, wherein said first length adjustable arm is or includes a powered hydraulic or pneumatic ram.

12. The vehicle trailer as claimed in claim 1, wherein said first length adjustable arm has an upper end associated with said elongate engagement key of said engagement arm assembly and a lower end which is mounted to or relative to a respective side rail.

13. The vehicle trailer as claimed in claim 1, wherein said second length adjustable arm exercises control over the position and movement of said elongate rigid arm and said first length adjustable arm exercises control over the position and orientation of said engagement key.

14. The vehicle trailer as claimed in claim 1, wherein said elongate engagement key is mounted to both said elongate rigid arm and said first length adjustable arm.

15. The vehicle trailer as claimed in claim 1, further including a transversely extending locking fastener or pin.

16. The vehicle trailer as claimed in claim 1, wherein said engagement key is substantially H-shaped in cross section having a pair of spaced apart arm portions linked by a transversely extending linking wall.

17. A vehicle trailer as claimed in claim 1, wherein a universal or multi axis joint is provided between the first length adjustable arm and the elongate key.

18. A vehicle trailer mounted bin system including:
a vehicle trailer displaying a draw assembly for engagement with a vehicle and a chassis associated with the draw assembly where said chassis is mounted on at least a pair of wheels;
at least a pair of spaced apart side rails, each side rail mounting an engagement arm assembly where each engagement arm assembly incudes a pair of engagement arm assemblies, one engagement arm assembly on either lateral side of the vehicle trailer;
one engagement arm assembly on either lateral side of the vehicle trailer;
an elongate rigid arm mounting an elongate engagement key;
a first length adjustable arm associated with the elongate engagement key
an object having an engagement arm assembly on either lateral side thereof, each having an elongate keyway to receive the respective elongate engagement key therein during loading of the bin on the trailer;
wherein the elongate rigid arm can be raised and lowered to load and unload said bin relative to the trailer and said elongate engagement key can be pivoted to tip said object mounted relative to the trailer, and
wherein an opening is provided through said elongate engagement key and a portion of said elongate keyway in order to accept a locking pin.

19. The vehicle trailer mounted bin system as claimed in claim 18, wherein said object is a bin and said elongate keyway is provided as a slot opening formed in a substantially planar plate which is located from a wall or surface of said bin such that an inner arm portion of said engagement key can be received between a substantially planar plate and said wall or surface of said bin.

20. The vehicle trailer mounted bin system as claimed in claim 19, wherein said elongate keyway is provided in a raised housing portion of said bin having a part which is spaced from said wall or surface of said bin.

21. The vehicle trailer mounted bin system as claimed in claim 19, wherein said elongate slot is closed at one end.

22. The vehicle trailer mounted bin system as claimed in claim 19, wherein said elongate keyway is provided on a plate that can then be temporarily attached to said object to be transported.

* * * * *